Figure 1:
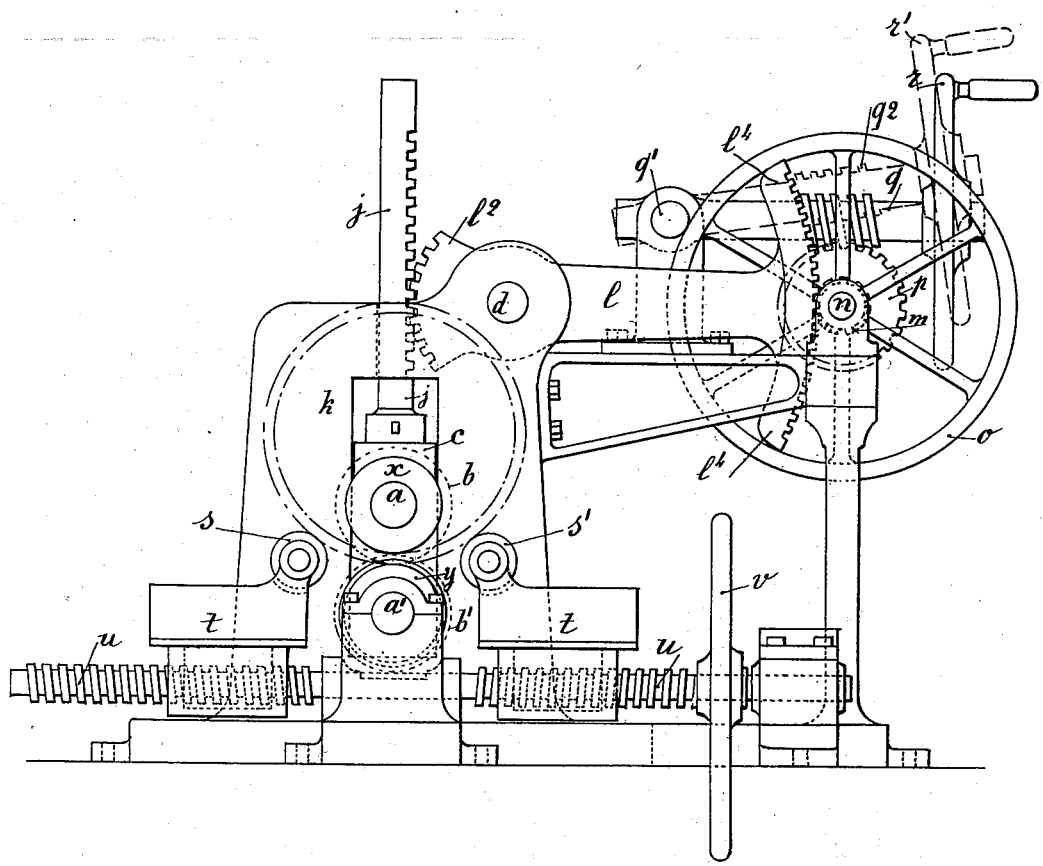

No. 651,740. Patented June 12, 1900.
A. ALLAGNIER.
ROLLING MILL.
(Application filed Apr. 21, 1899.)

(No Model.) 2 Sheets—Sheet 1.

Witnesses

Inventor
Alphonse Allagnier
by Alexander & Co
Attorneys

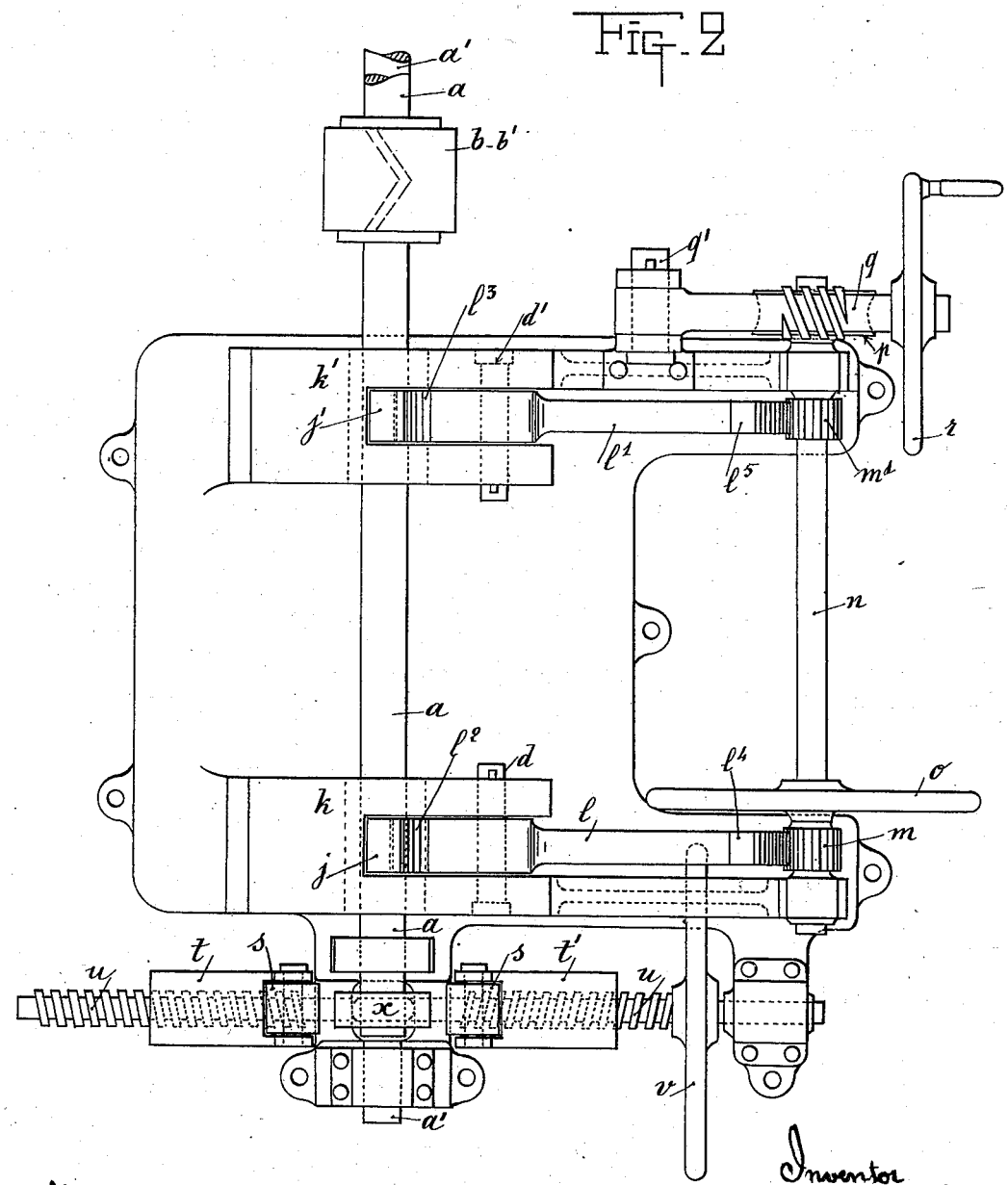

UNITED STATES PATENT OFFICE.

ALPHONSE ALLAGNIER, OF ALFORTVILLE, FRANCE.

ROLLING-MILL.

SPECIFICATION forming part of Letters Patent No. 651,740, dated June 12, 1900.

Application filed April 21, 1899. Serial No. 713,845. (No model.)

*To all whom it may concern:*

Be it known that I, ALPHONSE ALLAGNIER, a citizen of the Republic of France, and a resident of Alfortville, Seine, in the Republic of France, have invented certain new and useful Improvements in the Manufacture of Wheel-Rims and the Like, of which the following is a specification.

My invention relates to a rolling or laminating machine for manufacturing wheel-rims and similar articles which are rolled or laminated circularly and without welding, whether of iron, steel, or other metal capable of being laminated.

The invention consists, briefly stated, of a system of racks, gears, and endless screws, enabling one to quickly move the rolls or laminating-cylinders toward or away from each other before or after the introduction of the article to be laminated. The mechanism provides for producing a medium pressure upon the work or a slow heavy pressure, as may be desired.

In the drawings, Figure 1 is a front elevation, and Fig. 2 is a plan view, of a machine embodying my invention.

In this machine the axles or shafts $a\ a'$ of the rolls $x$ and $y$, respectively, are driven simultaneously by the gearing $b\ b'$ and are located inside of the boxes $k\ k'$, by which the upper shaft is guided in its movements toward and away from the lower shaft. The rolls are suitably shaped to effect upon a strip of metal the desired result in the way of stretching, thinning, compressing, and shaping, so as to produce a wheel-tire, for instance.

In order to allow the introduction of the endless metal strip between the rolls, the upper roll $x$ is movable vertically, its shaft $a$ being held suspended in bearings $c$ by means of two racks $j\ j'$, which slide within the boxes $k\ k'$. The racks are engaged by toothed sectors $l^2\ l^3$ at the ends of levers $l\ l'$, which are fulcrumed at the points $d\ d'$, and are provided at their opposite ends with toothed sectors $l^4\ l^5$. Meshing with these last-named sectors are two pinions $m\ m'$, secured upon the shaft $n$, which is provided with a hand-wheel $o$, the object of which is to enable the racks and the upper roll to be quickly raised in a manner apparent upon inspection. On the shaft $n$ is also secured a wheel $p$, provided with helicoidal teeth. Adjacent thereto is an endless screw or worm $q$, whose shaft is hinged at one end, as at $q'$, and can be rotated by a hand-wheel $r$. The hinging of the shaft $q$ is to permit the worm to be disengaged from the helicoidal gear $p$ when it is desired to operate the shaft $n$ quickly by means of the hand-wheel $o$. The worm then takes the position shown by the dotted lines $q^2\ r'$.

At the right and left of the laminating-rolls bending-rollers $s\ s'$ are arranged, mounted upon movable nuts $t\ t'$, which can be simultaneously moved away from or toward each other by means of the right and left hand screw $u$, operated by a hand-wheel $v$.

The lower roll $y$ simply rotates in its bearings without vertical movement.

In operation I make an annular strip of metal, by any well-known means, of any suitable shape or weight, and I heat this to a white heat. The upper roll having been raised, I insert the lower portion of the strip between the rolls, as shown in Fig. 1 in dotted lines. By means of the hand-wheel $o$ the upper roll is then lowered quickly upon the inside of the strip. The rollers $s\ s'$ are set at the proper distance apart to give the desired curvature to the rim or other work, and the rolls are started. When required, a slow pressure can be brought upon the strip by means of the worm $q$, which will slowly and powerfully rotate the shaft $n$ and force the racks and the upper roll downward. After the rolling has been finished the screw $q$ is lifted out of engagement with the wheel $p$, and the hand-wheel $o$ is operated in order to quickly raise the roll $x$ and liberate the work, which can then be removed and another strip inserted.

Having thus described my invention, what I claim, and desire to secure by Letters Patent, is—

1. A metal-rolling machine, comprising a roll journaled in stationary bearings, a roll journaled in bearings movable vertically away from said stationary roll, an upright rack connected with each of the movable bearings, levers having two sector-gears, one meshing with the rack, a pinion meshing with each of the other sector-gears, a worm-gear on the shaft of the pinions, a worm for actuating the worm-gear, and means for moving the worm into and out of mesh with the worm-gear.

2. A metal-rolling machine, comprising a roll journaled in stationary bearings, a roll journaled in bearings vertically movable toward and away from said stationary roll, an upright rack connected with said movable bearing, a lever having a long and a short arm each provided with sector-gears, the latter meshing with the rack, a pinion meshing with the other sector-gear, a helicoidal gear on the shaft of the pinion, a worm meshing with said helicoidal gear, and a worm-shaft hinged at one end and carrying a hand-wheel at the other.

In testimony that I claim the foregoing I have hereunto set my hand this 7th day of April, 1899.

ALPHONSE ALLAGNIER.

Witnesses:
EMILE COUCHOUD,
EDWARD P. MACLEAN.